United States Patent [19]
Blossom et al.

[11] 3,732,664
[45] May 15, 1973

[54] COLLATING AND INSERTING MACHINE CONTROL SYSTEM

[75] Inventors: Frank M. Blossom, Glen Ellyn, Ill.; John Silberbauer, St. Paul, Minn.

[73] Assignee: The Reuben H. Donnelley Corporation, New York, N.Y.

[22] Filed: Mar. 25, 1971

[21] Appl. No.: 127,924

[52] U.S. Cl. ..............................53/57, 53/60, 53/77
[51] Int. Cl. ..............................................B65b 57/16
[58] Field of Search.............................53/57, 60, 77

[56] References Cited

UNITED STATES PATENTS

| | | | |
|---|---|---|---|
| 2,058,005 | 10/1936 | Donnellan | 53/57 |
| 2,914,895 | 12/1959 | Martin | 53/57 X |
| 3,368,321 | 2/1968 | Sather et al. | 53/57 |

*Primary Examiner*—Travis S. McGehee
*Attorney*—Alexander and Speckman

[57] ABSTRACT

Control system for a collating and inserting machine in which signals are produced from failures in the feed of addressed pieces, inserts, or envelope and are applied to shift register and logic circuitry to control the operation of feed and conveyor mechanisms in a manner such that random failures of feed mechanisms do not result in a defective final product or in a shutdown of the machine. After any such random failure, any unnecessary succeeding operations are automatically locked out and any material accumulated from any incomplete operation is ejected. However, a counter for each feed mechanism counts failures during consecutive cycles and the machine is automatically shut down when the count exceeds a certain number, determined by a selector switch for each feed mechanism.

29 Claims, 14 Drawing Figures

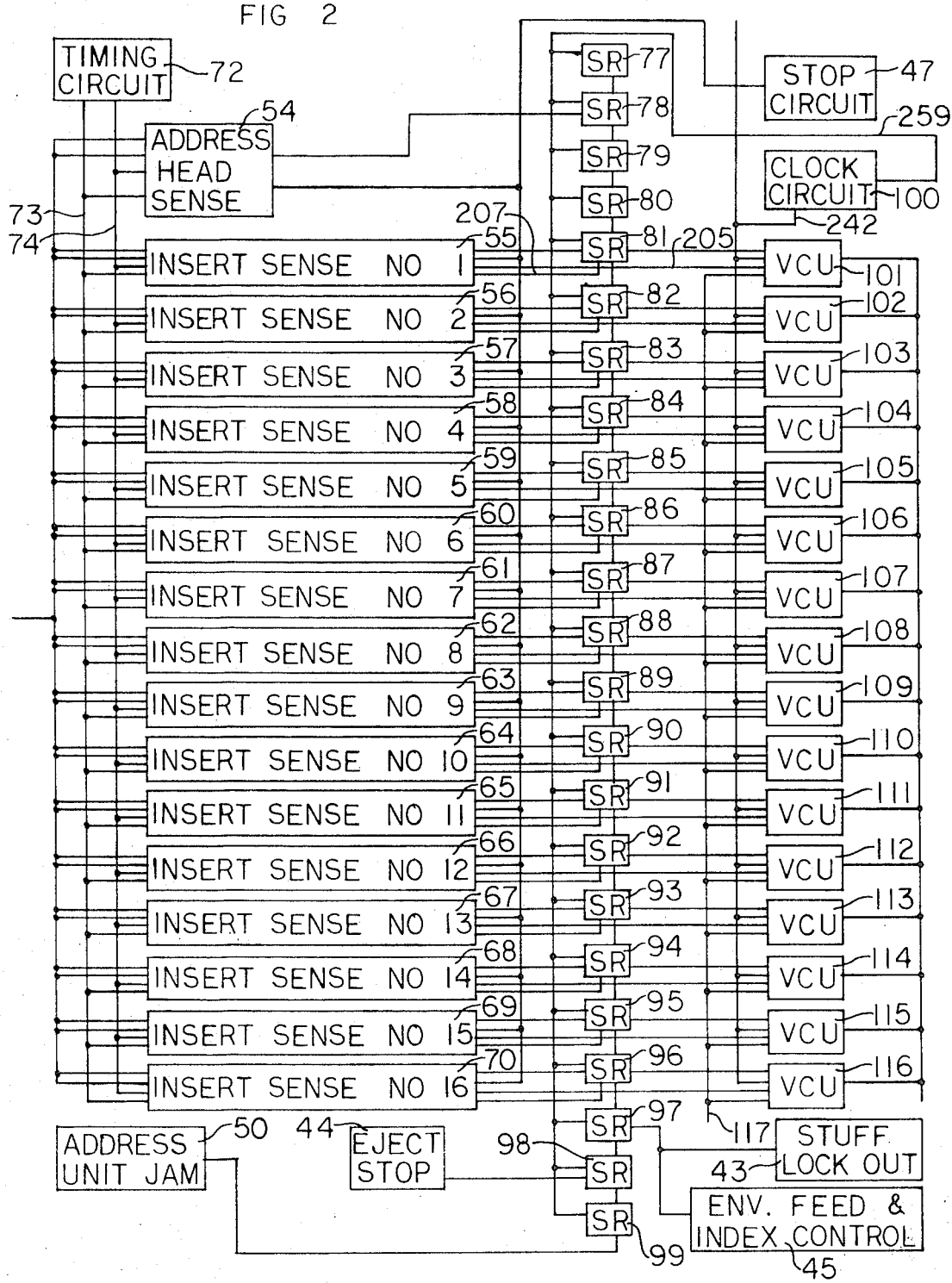

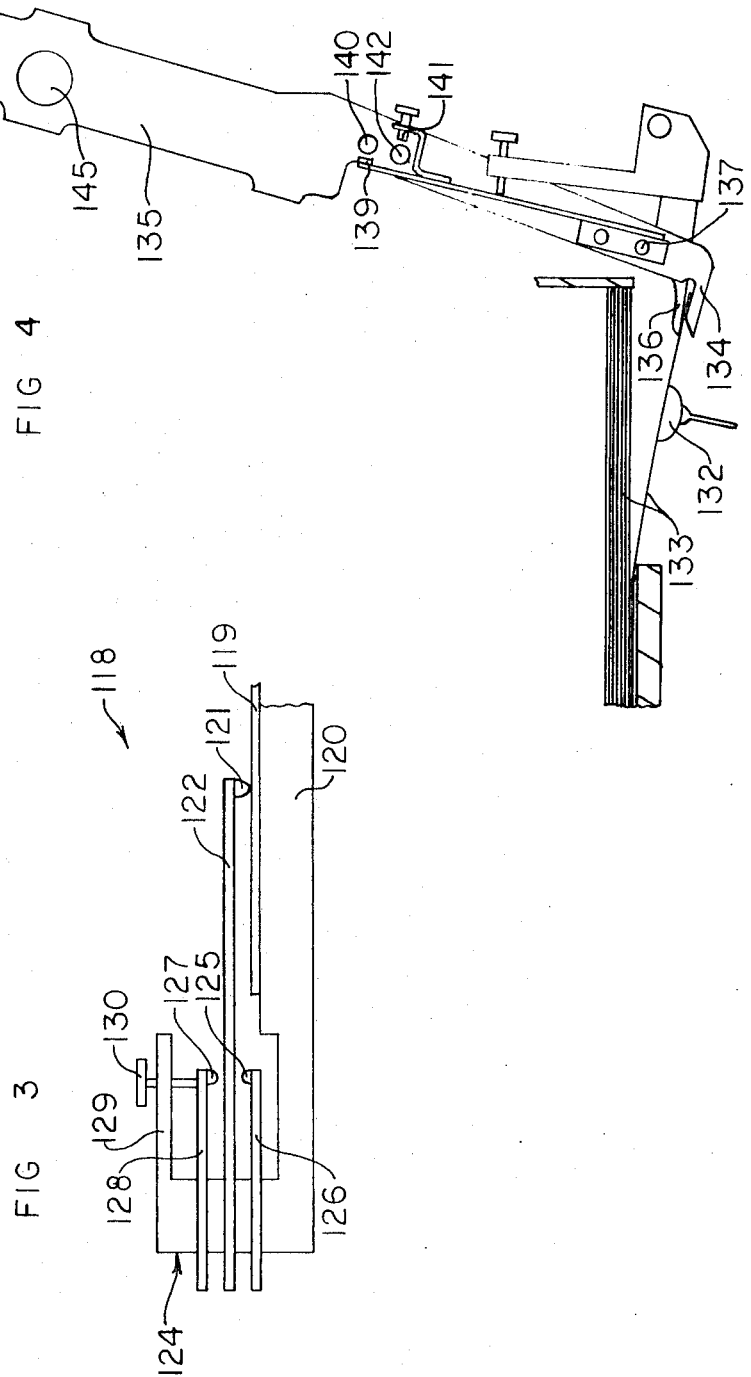

FIG 6

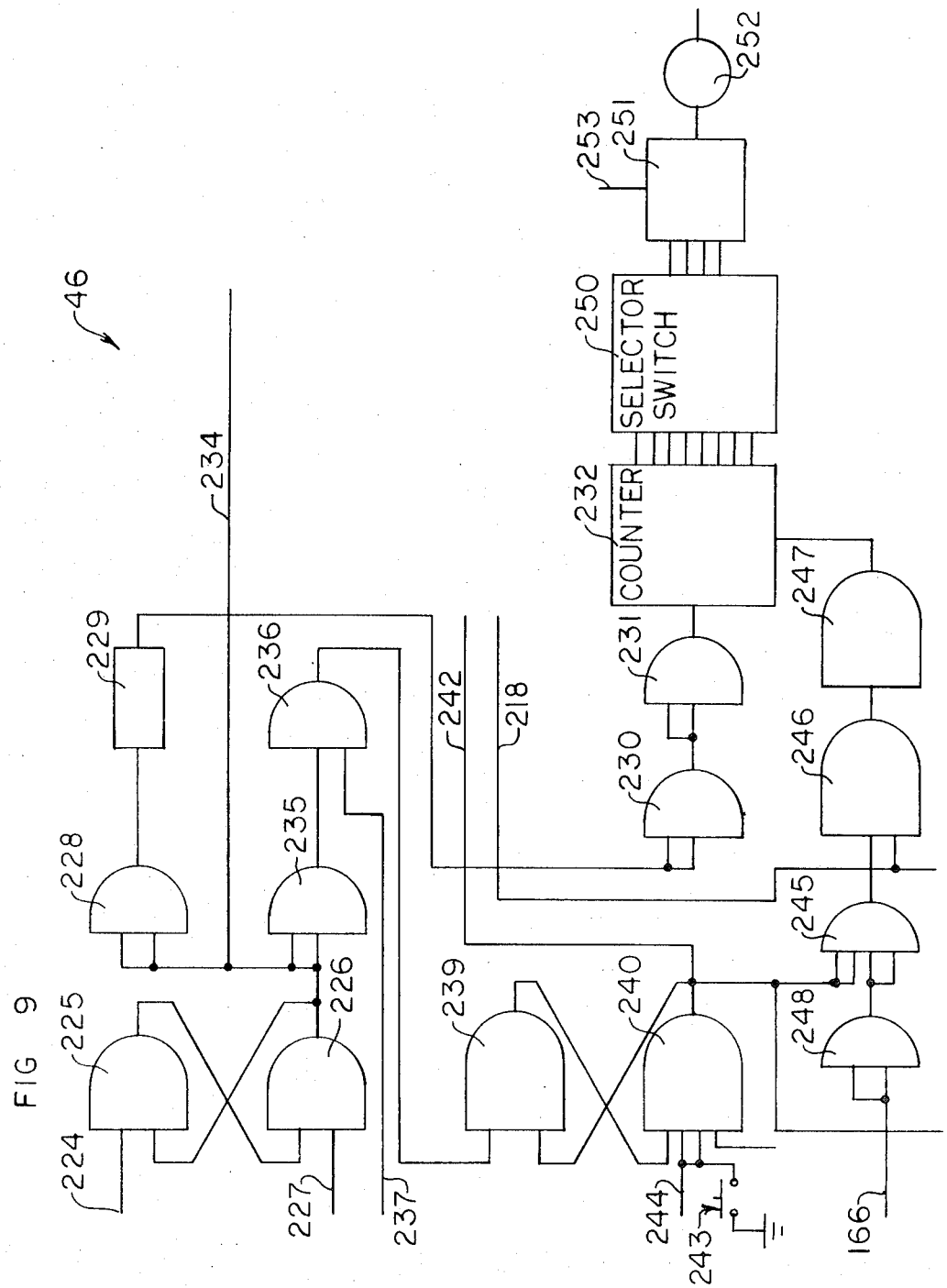

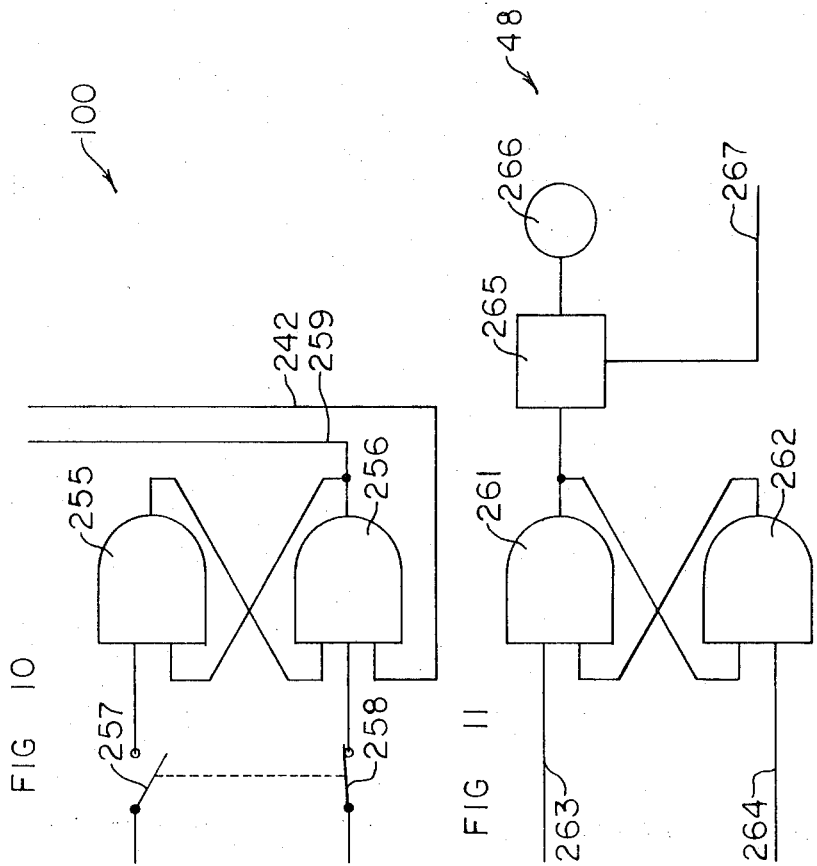

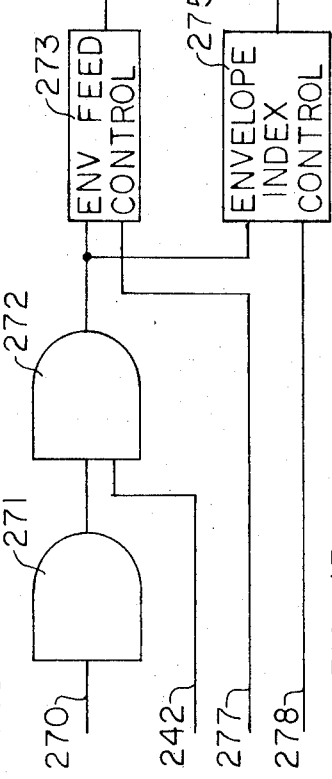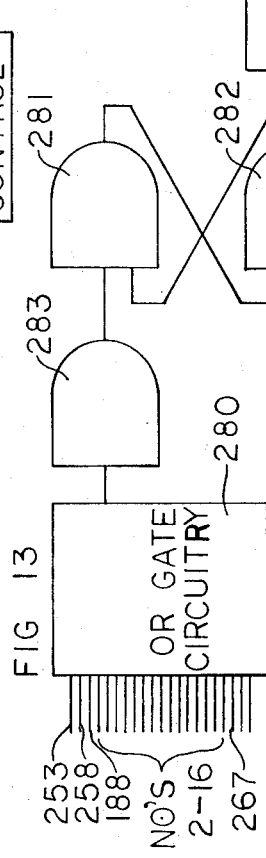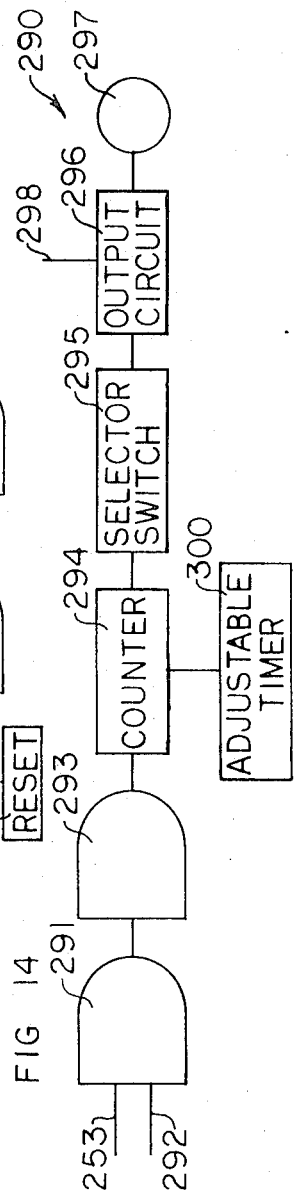

COLLATING AND INSERTING MACHINE CONTROL SYSTEM

This invention relates to a control system for a collating and inserting machine and more particularly to a control system which eliminates the production of defective final products while keeping the machine in operation and greatly increasing its efficiency. The system is highly reliable and versatile, being selectively controllable to obtain maximum efficiency under any given conditions of operation.

The control system of this invention has other applications but was specifically designed and is particularly advantageous when used with collating and inserting machines of a type known in the art. In general, such machines include a series of inert feed units operative in each cycle of operation to feed inserts to an insert conveyor which is indexed during each cycle, an envelope conveyor also indexed during each cycle to feed envelopes to a sense station and thence to stuffing, spraying and stacking stations, and a stuffing mechanism for inserting a stack of inserts from the insert conveyor into an envelope at the stuffing station. Such machines may also include an address head for addressing a piece upon which the inserts are stacked, the piece having an address printed thereon to be visible through the window of a window envelope.

In such collating and inserting machines, the feed mechanisms are subject to failure and if not detected, the final product will be defective with one or more missing inserts or with a plural number of a particular insert, or without an envelope. Systems have been tried in which the failure of individual feed mechanisms is detected and used to automatically shut down operation of the machine completely while a light is energized to indicate the cause of the failure. The operator can then inspect a particular mechanism and try to correct the trouble and restart the machine. The corrective procedure is usually quite time-consuming and usually a considerable amount of material is lost before the machine is again operating properly. The result is a great decrease in the efficiency of the operation.

This invention was evolved with the general object of overcoming the disadvantages of prior control systems and of providing an improved control system for increasing the efficiency and reliability of collating and inserting machines and other machines of a similar character.

The invention is based in part upon the discovery that in many cases, the failure of individual feed mechanisms occurs only in a random and temporary or non-repetitive basis. Thus, for example, an insert feed mechanism may occasionally miss feeding during one or two cycles but will then feed satisfactorily during succeeding cycles. As a result, it is difficult and time-consuming for an operator to attempt to ascertain the cause of an indicated miss-feed. It also means that the machine is completely shut down in many cases to correct troubles that are of a comparatively minor character.

According to this invention, a control system is provided in which a comparatively minor malfunction does not result in a complete shut-down of the machine and at the same time does not cause the machine to produce a defective final product.

According to an important feature, malfunction signals are produced in response to improper operation of individual feed mechanisms or other individual operation means and sensing circuit means respond to such malfunction signals to enter signals into corresponding stages of shift register means. A clock signal is applied to the shift register means during each cycle of operation to shift any signal entered into any stage thereof into a succeeding stage and operation control circuit means respond to the shifted signals to lock out operation of the corresponding operation means. In this way, any improper operation of an individual operation means does not result in any unnecessary operation subsequent thereto.

By way of example, as applied to a collating and inserting machine, if an address unit or any insert unit should fail to feed an addressed piece or insert, the operation of other insert units is automatically locked out during subsequent cycles of operation. Thus, no inserts are fed unnecessarily to the insert conveyor.

Another important feature relates to the automatic ejection of any inserts or other material or product resulting from an incomplete operation, to avoid the production of a defective final product.

A further important feature relates to the extension of the automatic control concept to a machine such as a collating and inserting machine in which there are first and second conveyors such as the insert and envelope conveyors operating in generally parallel relation with a transfer from the first conveyor to the second conveyor during each cycle. In accordance with the invention, the operation of the second conveyor and operations associated therewith are automatically locked out at an appropriate time in response to a malfunction of an individual operation means associated with the first conveyor.

Another very important feature relates to the counting of malfunctions of individual operation means during successive cycles and in the automatic shut-down of the machine when the number of malfunctions during successive cycles exceeds a certain number. Preferably, the number required for a complete shut-down may be selected by a manually operable selector switch.

Further important features relate to the control of the operation in response to "miss" and "double" signals from insert and address head feed mechanisms, a "miss" signal being developed in response to the failure of a feed mechanism to feed an insert or addressed piece and a "double" signal being developed in response to the feeding of a plurality of inserts or addressed pieces by a feed mechanism. In one mode of operation, only the miss signal will result in the entry of a signal into a stage of the shift register while both miss and double signals are counted to automatically shut down the machine when a certain number of signals are accumulated, the accumulated signals being either miss signals or double signals or a combination of both. In this mode of operation, the final product may include a plurality of one or more types of inserts which in most cases is not objectionable. In another mode of operation, both miss and double signals have the same effect and thus the final product will not contain a plurality of inserts of one type. Preferably, each circuit may be set for either mode of operation. Thus, for example, the system may not accommodate a double feed of the address unit, but may accommodate a double feed from one or more selected insert units.

Additional features relate to the sensing of the failure of feed of a first product such as an envelope and in the temporary lock-out of the supply of a second product such as the inserts. Preferably, signals from such failures are counted and the machine is automatically shut down in response to a certain number of such failures. In effect, the machine keeps trying to obtain the supply of the first product, holding off the supply of the second, and shuts down only if no feed is obtained after a certain number of tries.

Specific features of the invention relate to the configuration of logic circuitry for performing various required functions with a high degree of accuracy and reliability.

This invention contemplates other objects, features and advantages which will become more fully apparent from the following detailed description taken in conjunction with the accompanying drawings which illustrate a preferred embodiment thereof, in which:

FIG. 2 is a schematic diagram showing address head and insert sense circuitry, shift register circuitry and insert vacuum control circuitry and the interconnection thereof;

FIG. 3 is a view showing a type of sensing means usable in an address unit;

FIG. 4 is a view showing sensing means usable in each insert unit of the system;

FIG. 6 is a schematic diagram of an insert sense circuit;

FIG. 9 is a schematic diagram of envelope sense circuitry;

FIG. 10 is a schematic diagram of a clock circuit;

FIG. 11 is a schematic diagram of a stacker jam circuit;

FIG. 12 is a schematic diagram of envelope feed and index control circuitry;

FIG. 13 is a schematic diagram of a stop circuit; and

FIG. 14 is a schematic diagram of a circuit which may optionally be provided for stopping the machine in response to a certain number of malfunctions in a certain time interval.

Figure 1:
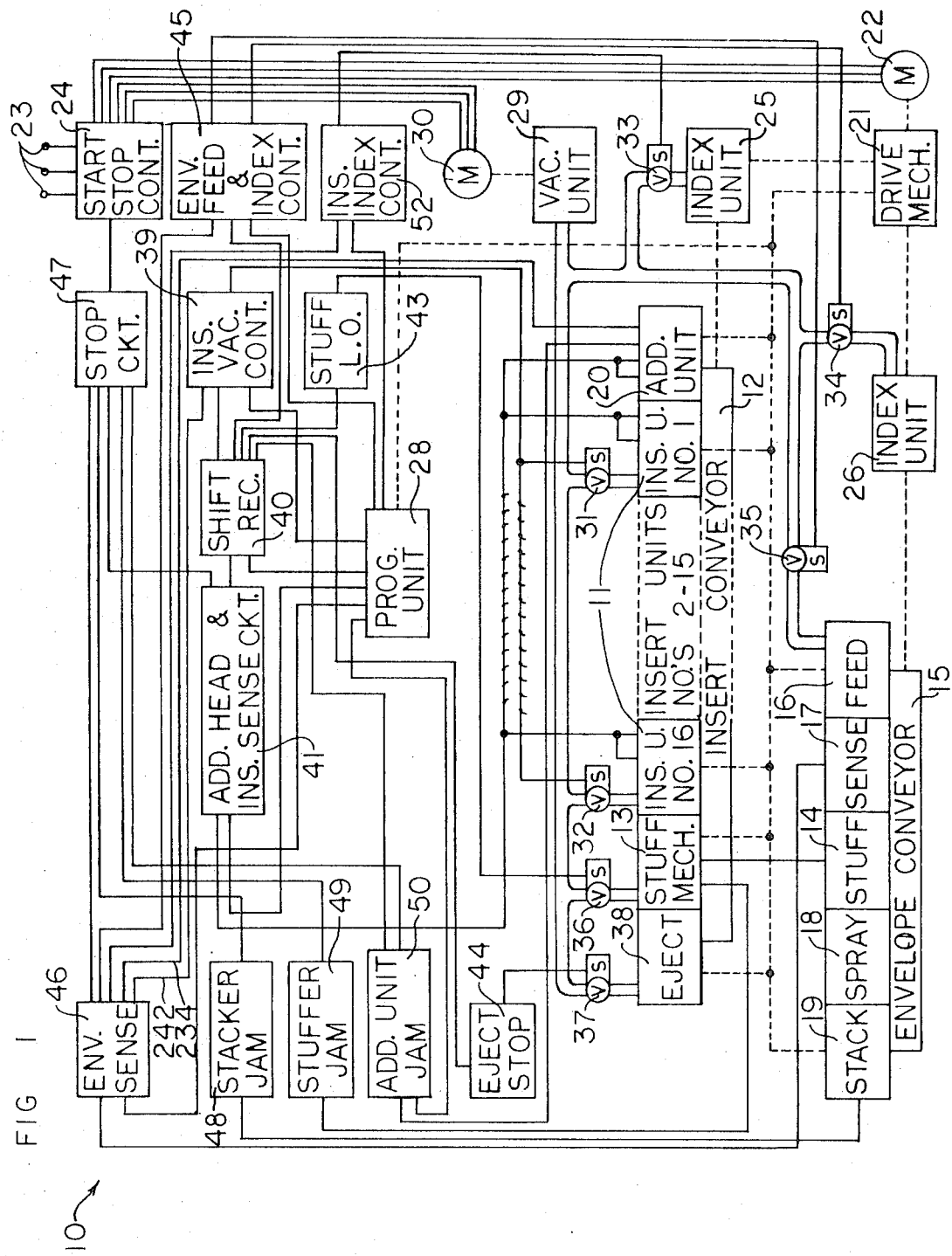
FIG. 1 is a schematic diagram showing a control system constructed according to the invention and applied to the control of a collating and inserting machine.

Reference numeral 10 generally designates a collating and inserting machine system incorporating an electrical control system constructed in accordance with the principles of this invention. The system 10 comprises a collating and inserting machine of a type well known in the art and similar to that shown in the Williams U.S. Pat. No. 2,325,455, for example, the purpose of which is to automatically insert or stuff a plurality of pieces of literature or the like, referred to as inserts, into envelopes and to seal the envelopes for mailing. As diagrammatically illustrated, a plurality of insert units 11 are provided along a flight or insert conveyor 12. The illustrated control arrangement is designed to accommodate 16 insert units, but it will be understood that a greater or lesser number may be provided and also, by operation of suitable selector switches, only selected ones of the units provided may be used in any given operation.

By way of example, each of the insert units 11 may comprise means for receiving a stack of pieces such as cards or pieces of advertising material or other literature, one or more suction cups for pulling down an edge portion of the lowermost piece of the stack, and gripper jaws for grasping the pulled-down edge portion of the lowermost piece, the gripper jaws being at the lower end of a pivotal transfer arm which swings about a longitudinal horizontal axis to transfer and drop the lowermost piece onto the flight or insert conveyor 12. The insert mechanisms are operated simultaneously and the transfer arms of all units may be mounted on a common horizontal shaft.

Indexing movement of the conveyor 12 is performed between operations of the insert mechanisms so that the inserts are stacked one on top of another and at the end of each indexing movement of the insert mechanisms, a stack of the inserts moves out of the final insert unit, the No. 16 unit as diagrammatically illustrated, into a stuffing position at which a stuffing mechanism 13 is operable to move the stack of inserts transversely into an envelope position at a stuffing station 14. The envelopes are moved by means of an envelope conveyor 15 from a supply stack at a feed station 16, thence through a sense station 17 to the station 14, thence to a spray station 18 at which the envelope flap is moistened and thence to a stacking station 19 at which the flaps may be sealed and the envelopes stacked. Means are provided at the sensing and stuffing stations 17 and 14 for opening and holding open the envelope flap.

Names and addresses may be applied to the envelopes at the stacking station 19 or in a separate operation. In the alternative, window envelopes may be used and address unit 20 may be used to imprint names and addresses on a piece placed on the conveyor 12 ahead of the insert deposited by the first of the insert units 11.

The mechanisms of the various component units are mechanically coupled to a drive mechanism 21, as diagrammatically indicated by dotted lines, mechanism 21 being driven by motor 22 which is connected to three-phase line terminals 23 through contactors in a start-stop control circuit 24. The drive mechanism 21 is also mechanically coupled through an index unit 25 to the insert conveyor 12 and through an index unit 26 to the envelope conveyor 15, and to a program unit 28. Program unit 28 functions as a cycle control unit and is of a type well known in the art. It may, for example, comprise a shaft driven through one revolution during each cycle of operation of the machine and carrying a plurality of cams which operate limit switches to control various functions as hereinafter described. The rotation of the shaft through a full turn or 360° is indicated by a dial calibrated in 100 equal divisions, to which reference is made hereinafter. Dial position "25", for example, corresponds to rotation through 90° or a quarter turn from the "0" position.

To supply suction for the suction cups of the insert units 11 and for controlling various operations, a vacuum unit 29 is provided, driven by a motor 30 which is energized through the start-stop control circuit 24 at the same time that the drive motor 22 is energized. Vacuum unit 29 is connected through solenoid operated valves 31 and 32 to the suction cups of the No. 1 and No. 16 insert units 11 as shown in FIG. 1 and is connected through similar solenoid operated valves to the suction cups of the No's 2–15 insert units. In addition, vacuum unit 29 is connected through a solenoid operated valve 33 to the insert conveyor index unit 25, through a solenoid operated valve 34 to the envelope conveyor index unit 26, through a solenoid operated valve 35 to the envelope feed mechanism 16 and through a solenoid operated valve 36 to the stuffing mechanism 13. Vacuum operated means are provided in the stuffing mechanism 13 to move a pusher device thereof from an operative position to an inoperative position, to thus "lock-out" the stuffing mechanism 13.

Vacuum unit 29 is also connected to the eject mechanism 38 through a solenoid operated valve 37, a vacuum-operated stop mechanism being provided to lift a stop device and to permit ejection of material from the end of the insert conveyor 12, when such inserts are not stuffed into an envelope, as hereinafter described. Vacuum operated means may also be provided for effecting various other operations, but since the details thereof are not necessary to an understanding of the control arrangement of the invention, they are not shown in the schematic diagram of FIG. 1. The solenoid operated valves 31 and 32 for the illustrated No. 1 and No. 16 insert units, as well as the solenoid valves for the No.'s 2-15 insert units are connected to outputs of an insert vacuum control circuit 39 which has inputs connected to outputs from a shift register 40 and the program unit 28. The shift register 40 has inputs connected to the program unit 28 and to address head and insert sense circuitry 41 which has inputs connected to the program unit 28, the address unit 20 and to all 16 of the insert units 11.

When the address unit 20 fails to supply an addressed piece to the conveyor 12 or when any of the insert units 11 fail to supply inserts to the conveyor 12, a "miss" signal is developed and through the circuitry 41, the shift register 40 and the insert vacuum control circuitry 39, the connection of the vacuum unit 29 to the vacuum cups in the insert units 11 is controlled during successive cycles of operation in a manner such as to prevent any unnecessary transfer to and piling up of inserts on the insert conveyor 12. In response to such "miss" signals, the shift register 40 also controls the solenoid operated valves 36 and 37 through a stuffer lock-out circuit 43 and an eject stop circuit 44 in a manner such as to prevent stuffing of an incomplete pile of inserts into an envelope and to effect ejection of the incomplete pile from the end of the insert conveyor 12.

Also in response to such "miss" signals, the shift register 40 controls through an envelope feed and index control circuit 45 the solenoid operated valve 35 for the envelope feed mechanism 16 and the solenoid operated valve 34 for the envelope index unit 26 to prevent operation thereof. However, if a stored "miss" signal from the shift register 40 is applied to prevent operation of the stuffer mechanism 13 at the same time that there is no envelope at the envelope sense station 17, an override is provided to allow operation of the envelope feed station 16 and indexing movement of the envelope conveyor 15. For this purpose logic circuitry is provided in the envelope feed and index control circuit 45 having an input connected to an output of an envelope sensing circuit 46 which has inputs connected to the envelope sensing station 17 and the program unit 28.

Sensing means in the address unit 20 and in the insert units 11 also supply "double" signals corresponding to the transfer of a plurality of addressed pieces or inserts. Each "double" signal may produce the same effect as a "miss" signal. In the alternative, by operation of selector switches in the circuits, the transfer of a plurality of inserts from any one of the insert units may be accommodated. In either case, if any unit developes either a "miss" signal or a "double" signal during a preselected number of consecutive cycles of operation, the machine can be automatically shut down. For this purpose, counters are provided in the address head and insert sensing circuitry 41 and an output signal is applied to a stop circuit 47, connected to the start and stop control 24. Stop circuit 47 is also connected to the outputs of a stacker jam circuit 48, a stuffer jam circuit 49 and an address unit jam circuit 50, to automatically stop operation in the event of jamming of the stacker 19, the stuffer mechanism 13 or the address unit 20.

When no envelope is supplied to the sense station 17, the envelope sense circuit 46 operates to apply a signal to the address unit 20 to prevent operation thereof and also operates to supply a signal to the insert vacuum control circuit 39 which in turn functions to prevent supply of vacuum to all insert units 11. At the same time, a signal is applied to an insert index control circuit 52 to prevent application of a signal to the solenoid operated valve 33 and to thereby prevent operation of the insert conveyor index unit 25. The envelope feed station and the envelope conveyor 15 are operated and if an envelope is applied to the sense station 17 during the next cycle, the operation is continued in normal fashion. If no envelope is then supplied, the address unit 20 and the insert units 11 are again locked out and the insert conveyor 12 is not operated, the envelope feed station 16 and the envelope conveyor 15 being again operated. This operation may be repeated a number of times and in effect, the system keeps trying to obtain a supply of an envelope. However, during each operation, a signal is applied to a counter in the envelope sense circuit 46 and if no envelope is supplied after a selected number of operations, a signal is applied from the envelope sense circuit 46 to the stop circuit 47 to stop operation of the machine.

FIG. 2 is a block diagram showing the interconnection of address head and insert sense circuitry 41, stages of the shift register 40 and the insert vacuum control circuitry 39. Included in the circuitry 41 are an address head sense circuit 54 and sixteen insert sense circuits 55-70, each of which includes registering and counting circuits. A timing circuit 72 applies clock and reset signals to all circuits 54-70 through lines 73 and 74. The clock signal on line 73 is applied during the portion of a cycle of operation when a piece is normally at a certain position in the address unit 20 and when inserts are normally being picked off for feed to the conveyor 12 by the insert units 11. If the feeds of the addressed pieces or inserts are performed properly during a cycle, no signals are stored or counted in the circuits 54-70. However, if the feed is not performed properly in one or more of the units, a signal or signals will be registered in the corresponding counter or counters and such registering will prevent application of the reset signal, applied on line 74, from resetting such counter or counters in which the signals are registered. However, if during the next cycle, the feed is performed properly in any such unit, the reset signal will reset the counter of the corresponding circuit. Thus, each counter will accumulate signals only if there are misses during a number of consecutive cycles.

Each of the units 54-70 further includes a selector switch which determines the number of consecutive cycles of improper operation which are required to shut down operation of the system. For example, the selector switch of unit 54 may be set at "3" and the insert sense circuit 55 may be set at "6". With improper feed of the address unit 20 during three consecutive cycles, a stop signal will be applied to the stop circuit 47 to shut down the system, but improper feed of the No. 1 unit 11 during six consecutive cycles will be required for shut-down of the operation of the system.

The illustrated shift register 40 comprises 23 stages 77–99 and a clock signal is applied to all stages from a clock circuit 100, connected to the program unit 28, the clock signal being operable to cause transfer of signals seriatim from one shift register stage to another. An output from the address head sensing circuit 54 is applied to the stage 78 while outputs from the insert sensing circuits 55–70 are respectively applied to the stages 81–96. Outputs from the stages 81–96 are respectively connected to units 101–116 forming the insert vacuum control circuit, the outputs of units 101 and 116 being connected to the solenoid operated valves 31 and 32 and the outputs of units 102–115 being connected to the solenoid operated valves for the insert units No.'s 2–15. Normally, the units 101–116 are activated by a signal applied thereto from a line 117, connected to the program unit 28, but individual units may be locked out by signals applied from the shift register stages 81–96, or all can be locked out by a signal from the envelope sensor circuit 46 as described hereinafter.

The output of the shift register stage 97 is applied to the envelope feed and index control circuit 45 and also to the stuffer lock-out circuit 43. The outputs of stages 98 and 99 are applied to the eject stop circuit 44 and the address unit jam circuit 50.

In operation, if for example no piece is fed in the address head 20 during one cycle, a signal is entered into the shift register stage 78 from the address head sensing circuit 54. A clock signal is thereafter applied from the clock circuit 100 to shift the signal to the shift register stage 79, the stage 78 being cleared. In the next or second cycle, the clock signal shifts the signal to the stages 80 and in the third cycle, the signal is shifted to the stage 81. In the fourth cycle, the stage 81 applies a signal to the insert vacuum control unit 101 to prevent the unit 101 from energizing and operating the solenoid operated valve 31 during the portion of the cycle of operation in which vacuum is normally applied to the suction means so that no insert will be transferred by the No. 1 insert unit, the unit being thus locked out. The clock signal then shifts the signal from the stage 81 to the stage 82 and in the fifth cycle, a signal is applied from stage 82 to the insert vacuum control unit 102 to lock out the No. 2 unit. During succeeding cycles, the insert units No.'s 3–16 are progressively locked out in a similar fashion.

Similarly, if any insert units fail to transfer an insert, succeeding units are progressively locked out in successive cycles. Thus, if during one cycle, the No. 1 unit fails to transfer an insert, the sensing circuit 54 will enter a circuit into the shift register stage 81 and the clock signal then transfers the signal to the stage 82 which during the next cycle applies a signal to the unit 102 to lock out the No. 2 insert unit.

When a signal is transferred to the shift register stage 97 that stage in the next cycle applies a signal to the envelope feed and index control circuit 45 to prevent energization and opening of the solenoid operated valves 34 and 35 and to prevent indexing movement of the envelope conveyor 15 and the operation of the envelope feed unit 16. At the same time, a signal is applied from stage 97 to the stuffing lock-out circuit 43 to prevent energization and opening of the solenoid operated valve 36 and to prevent any material at the stuffing mechanism 13 from being transferred to the stuffing station 14. The signal is then transferred from shift register stage 97 to the shift register stage 98 and in the following cycle, the shift register stage 98 applies a signal to the eject stop circuit 44 which effects energization of the solenoid operated valve 37 to move a stop device upwardly and to allow an incomplete pile of inserts to be ejected.

Referring to FIG. 3, reference numeral 118 generally designates a form of sensing means which may be used at the address unit 20. In being fed in the unit 20, a piece 119 is normally supported on a plate 120 and elevates a feeler 121 to a position as shown, feeler 121 being on one end of a resilient arm 122 the other end of which is sufficiently supported with respect to the plate 20 through a support structure 124. With no piece on the support plate 120, the feeler 121 engages the surface of the plate 120 and the arm 122 simultaneously engages a contact 125 on an arm 126 and with two or more pieces, the feeler 121 is elevated to a position such that the arm 22 engages a contact 127 on an arm 128. If, as shown, the feeler is engaged with a single piece, the arm 122 is positioned intermediate the contacts 125 and 127 as shown. Both arms 126 and 128 are supported from the structures 124 which also supports a rigid arm 129 carrying an adjustment screw 130, which is so adjusted to cause engagement of the arm 122 with contact 127 when the feeler 121 is positioned above the surface of the plate 120 a distance greater than the thickness of the type of pieces which are fed. Contact 125 is so positioned that the arm 122 is disengaged therefrom when the feeler is spaced from the surface of the plate 120 by a distance exceeding the minimum thickness of pieces transferred. Thus, arms 122 and 126 are electrically connected when there is a "miss", i.e. when no piece is transferred while arms 122 and 128 are electrically connected when there is a "double", i.e. when a plurality of pieces are transferred.

FIG. 4 shows diagrammatically a portion of the mechanism of one of the insert units 11 and a sensing arrangement associated therewith. The insert unit includes a suction cup 132 controlled by an actuating mechanism, not shown, to move up and engage the lowermost one of a stack of inserts 133 and then to move down to a position as shown such that the edge portion of the piece 133 can be grasped between a jaw 134 fixed on the lower end of a pick-off or transfer arm 135 and a jaw 136 pivotally supported on the arm 135 by a pin 137. When arm 135 is moved in a counter-clockwise direction to the position as shown, the jaw 136 is pivoted relative to the arm 135 in a clockwise direction, by actuating mechanism not shown. When the transfer arm 135 reaches the position as shown, the jaw 136 is then pivoted in a clockwise direction to graph the edge portion of the lowermost insert 133. When the suction in cup 132 is released an arm 135 is moved in a counter-clockwise direction to transfer the insert to the insert conveyor 12.

The particular sensing arrangement as illustrated is unique and has a number of advantageous features which are described in a copending application of Frank M. Blossom, Jr. entitled "SPECIFIC ERROR DETECTOR FOR PICKER ARM", Ser. No. 128,013, filed Mar. 25, 1971. In general, contacts 139 and 140 are engaged when there is a "double" feed and contacts 141 and 142 are engaged when there is a "miss".

Figure 5:
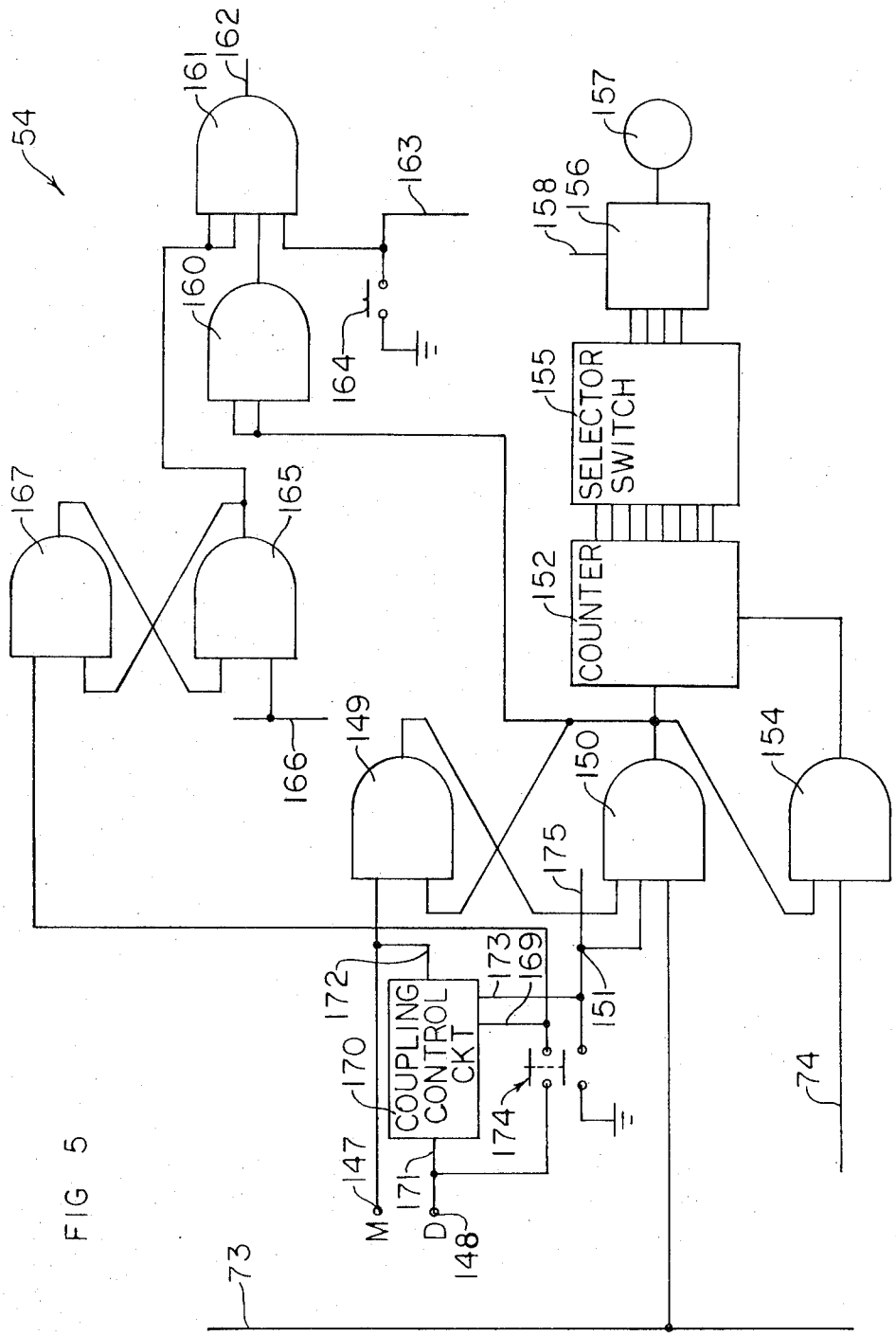
FIG. 5 is a schematic diagram of an address head sensing circuit.

FIG. 5 is a schematic diagram of the address head sensing circuit 54. "Miss" and "double" input terminals 147 and 148 are provided which may be connected to arms 126 and 128 of the switch of FIG. 3, arm 122 being grounded. The "miss" input terminal 147 is connected to one input of a gate 149 having a second input terminal and an output terminal respectively connected to an output terminal and input terminal of a second gate 150. Gate 150 has a second input terminal connected to the clock line 73 and a third input terminal connected to a circuit point 151. Each of the gates 149 and 150, as well as other gates referred to hereinafter, is of a type which develops a "low" output only if all inputs are "high" and develops a "high" output if one or more inputs are "low".

Normally, both inputs of gate 149 are high, placing the output terminal thereof low, the clock line 73 is low and the input of gate 150, connected to terminal circuit point 151 is high, with the output of gate 150 being high.

If a clock signal is applied when there is no miss signal, the output of gate 150 remains high since the output of gate 149 is low. However, if there is a miss signal, the output of gate 149 will be high and when the clock line 73 goes high, all three inputs of the gate 150 will be high, causing the output thereof to go low and to remain low until the clock pulse is terminated.

Thus a negative-going pulse is developed at the output of gate 150 when there is a miss signal at the time when the clock signal is applied. This negative-going pulse is applied to a counter 152 to be registered thereby.

If during the next cycle, no signal is applied at the proper time to the upper input of gate 149, the counter 152 will be reset. In particular, the reset line 74 is connected to one input of a gate 154 having a second input connected to the output of gate 150 and having an output connected to a reset input of the counter 152. The reset line 74 is normally low but goes high after the start of the clock signal and goes low again before the end of the clock signal. If the output of gate 150 is high during the reset signal, the output of gate 154 will go low to apply a negative-going pulse to the reset input of the counter 152 and to reset the counter 152. If, however, the output of gate 150 is low, the output of gate 154 will not go low and the counter will not be reset. Thus, the counter 152 will accumulate counts only if there are miss signals during consecutive cycles and is reset in any cycle in which there is no miss signal.

The counter 152 is connected through a selector switch unit 155 to an output stage 156 which is connected to a signal light 157 and also through a line 158 to the stop circuit 47. Selector switch 155 is set manually to determine the number of consecutive misses required to shut down operation. If, for example, the switch 155 is set at "3" and there are misses in three consecutive cycles, the signal light 157 is energized and a signal is applied through line 158 to shut down the machine. The operator, observing that the light 157 is energized, can then check the address head 20 to ascertain the cause of the difficulty and to correct it.

The output of the gate 150 is also applied through a gate 160, operative simply as an inverter, to one input of a gate 161, the output of which is connected through a line 162 to the shift register stage 78. A second input of the gate 161 is connected to a line 163 and through a switch 164 to ground. A third input is connected to the output of a gate 165. When a miss signal is developed, the output of gate or inverter 160 goes high and if the other two inputs of gate 161 are also high, the output on line 162 will go low, entering a signal in the shift register stage 78. In the case of a double, however, and depending upon the setting of controls, the output of gate 165 may be low to prevent the output of gate 161 from going low and to prevent entry of a signal into the shift register stage 78. Switch 164 may also be closed to prevent the output of gate 161 from going low, when operation of the address head is not desired.

Gate 165 has one input connected to the line 166 from the program unit 28 and a second input connected to the output of a gate 167. One input of the gate 167 is connected to the output of the gate 165 while a second input is connected to a terminal 169 of a coupling control circuit 170 having a terminal 171 connected to the double input terminal 148, a terminal 172 connected to the upper terminal of the gate 149 and to the miss input terminal 147 and a terminal 173 connected to the circuit point 151. Coupling control circuit 170, which may be controllable from a main control panel, may be set to couple only the input terminals 171 and 172 in which case the double signals are applied only to the upper input of gate 149 in the same way as miss signals, so that both double and miss signals produce the same effect as described above.

Coupling control circuit 170 may also be set to couple double signals from terminal 171 to terminal 172 and to also couple such double signals to terminal 169 without, however, back coupling miss signals to the terminal 169. By way of example, isolation diodes may be used in the coupling connections. In this case, a double signal coupled to the terminal 169 causes the upper input of gate 167 to go low and the output thereof to go high. If at the same time, line 166 is high, the output of gate 165 will go low to prevent the output of gate 161 from going low and to prevent entry of a signal into the shift register stage 78. The output of gate 165 will remain low until the line 166 goes low, which is so controlled from the program unit 28 as to occur after the end of a clock signal on line 73.

A manually operable address unit lock-out switch 174 is provided which is operable to connect terminal 148 to the upper input of gate 167 and to connect the circuit point 151 to ground, thus preventing operation of the gate 150. Circuit point 151 may be connected through a line 175 to a suitable control means for preventing operation of the address unit 20.

To summarize the operation of the address head sensing circuit of FIG. 5, the mode of operation is determined by the coupling control circuit 170 which is preferably controlled from controls in a central control panel. If the circuit is set to apply double signals from terminal 171 to terminal 172 and not to the terminal 169, both miss and double signals will have the same effect. In each case, a signal will be registered by the counter 152 and will also be applied through line 162 to the shift register stage 78. If the circuit is set to apply double signals from terminal 171 to terminal 172 and also to terminal 169, both miss and double signals will be registered by the counter 152, but only in response to a miss signal will there be a signal applied through output line 162 to the shift register stage 78.

Figure 6:
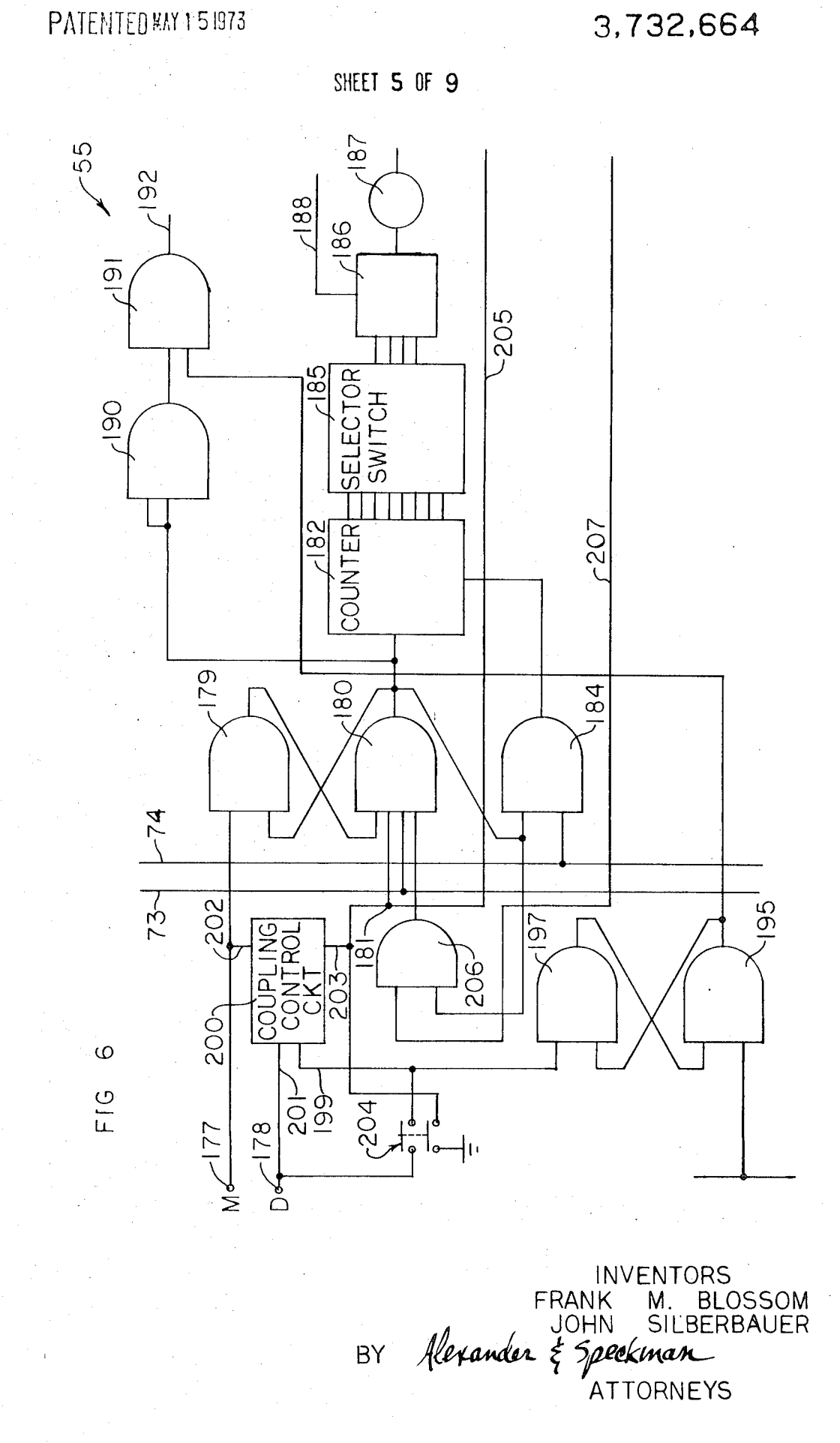

FIG. 6 is a schematic diagram of the No. 1 insert sensing circuit 55, the circuits 56–70 being substantially identical thereto. The circuit 55 is very similar to the address head sensing circuit 54 of FIG. 5 and includes miss and double input terminals 177 and 178 which correspond to input terminals 147 and 148 and which may be respectively connected to terminals 142 and 140 of the sensing arrangement shown in FIG. 4. Circuit 55 further includes gates 179 and 180 a circuit point 181, a counter 182, a gate 184, a selector switch 185, an output circuit 186, a signal lamp 187, an output line 188, gates 190 and 191, an output line 192 and gates 195 and 197 respectively corresponding to elements 149 and 152, 154–158, 160–162, 165 and 167 of the circuit of FIG. 5, and operative in substantially the same fashion. An input of the gate 197 is connected to a terminal 199 of a coupling circuit 200, corresponding to coupling circuit 170 and having terminals 201, 202 and 203 respectively connected to terminal 178, the upper terminal gate 179 and the circuit point 181. Switch 204 corresponds to switch 174 and a line 205, corresponding to the line 175, is connected to the insert vacuum control unit 101 to lock out the No. 1 insert unit when switch 204 is actuated.

Insert sensing circuit 55 differs from the address head sensing circuit 54 in that the gate 180 has an input connected to the output of a gate 206 which has one input connected to the output of gate 180 and a second input connected through a line 207 to the shift register stage 81. The function of this arrangement is to prevent registration of a count in the counter 152 when a signal is registered in the shift register stage by reason of a miss or double in the address head unit 20 in a previous cycle. If a signal is so registered in the shift register stage 81, the line 207 goes high and the output of gate 207 goes low to prevent the output of gate 180 from going low and to thereby prevent registration of a count in the counter 152.

Figure 7:
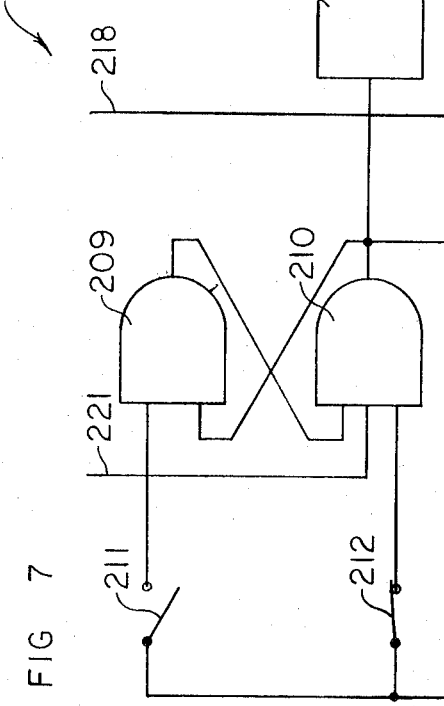
FIG. 7 is a schematic diagram of a timing circuit.
Figure 8:
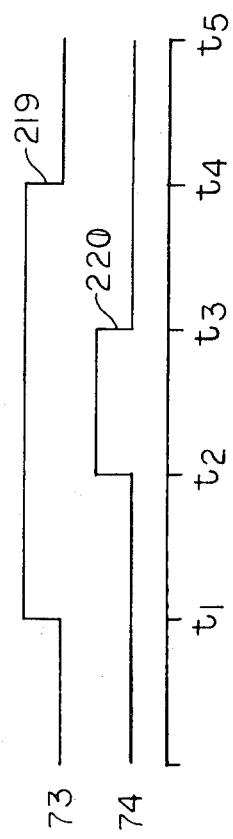
FIG. 8 is a timing diagram for explanation of the operation of the timing circuit of FIG. 7.

FIG. 7 is a schematic diagram of the timing circuit 72 and FIG. 8 is an explanatory timing diagram. A pair of gates 209 and 210 are provided each having an input connected to the output of the other. Additional inputs are connected to limit switches 211 and 212 which are in the program unit 28, the switches being ganged together with switch 11 being normally open while switch 212 is normally closed. The output of gate 209 is normally low while the output of gate 210 is high.

At a certain point in the cycle of operation indicated at $t_1$ in FIG. 8, which may be at dial position "35", switch 211 is closed and switch 212 is opened causing the output of gate 209 to go high while the output of gate 210 goes low. The output of gate 210 is applied through a gate circuit 214, operative as an inverter, to the clock line 73 and thus the clock line goes high at time $t_1$. The output of gate 210 is also applied through a time delay circuit 215 which time $t_2$ to apply a signal to a monostable multi-vibrator 216 operative to develop an output which shifts from high to low at time $t_2$ and back to high at a time $t_3$. The output of the monostable multi-vibrator 216 is applied to the reset line 74 through a gate 217. Gate 217 has a second input connected to a line 218 to which a reset signal may be applied.

Thereafter at a time $t_4$ which may, for example, be at dial position "50", switch 211 is again opened and switch 212 is again closed, closing the output of gate 209 to go low, the output of gate 210 to go high and the output of gate 214 to go low. Thus, a clock pulse 219 is generated from time $t_1$ to time $t_4$ and a reset pulse 220 is generated from time $t_2$ to time $t_3$, the reset pulse 220 starting after and ending before the clock pulse 219.

It is noted that the gate 210 has a third input connected to a line 221 which is connected to the envelope sensing circuit 46 for the purpose of locking out operation of the timing circuit when there is no envelope at the sensing station 17. Line 221 is normally high but goes low to prevent operation of the gate 210.

FIG. 9 is a schematic diagram of the envelope sensing circuit 46. At the sensing station 17, sensing means are provided which may comprise a switch arrangement similar to the parts of the switch arrangement of FIG. 3 necessary to signal the presence or absence of a piece. Such sensing means are connected to a terminal 224 which is connected to an input of a gate 225 having an output connected to the input of a gate 226, the output of gate 226 being connected to the second input of the gate 225. A second input of gate 226 is connected to a terminal 227 which is connected to a reset switch in the program unit 28. The input of gate 225 connected to terminal 224 is high when an envelope is present at the station 17 and goes low when an envelope is missing to cause the output of gate 225 to go high and the output of gate 226 to go low, the input of gate 226 connected to terminal 227 being high. At a latter point in the cycle of operation, when the sensing operation of the overall circuit is completed, the reset switch in the program unit 28 closes to cause the terminal 227 to go low and to cause the output of gate 226 to return to the high state.

The output of gate 226 is applied through a gate 228, operative as an inverter, to a monostable multi-vibrator 229, the output of which is applied through a pair of cascaded gates 230 and 231, both operative as inverters, to a counter 232. When the output of gate 226 goes low, due to a missing envelope, the multi-vibrator 229 is triggered and after a certain time delay, a count is entered into the counter 232 from the gate 231.

The output of gate 226 is also applied through a line 234 to the address unit 20 to lock out the operation thereof.

In addition, the output of gate 226 is applied through a gate 235, operative as an inverter, to one input of a gate 236, a second input of which is connected to a terminal 237 connected to a switch in the program unit 28. When the output of gate 226 goes low in response to a missing envelope, the output of gate 235 goes high and when the switch in the program unit opens, terminal 237 also goes high, causing the output of gate 236 to go low and causing a latching operation of a pair of gates 239 and 240 having outputs cross-connected to inputs thereof, one input of gate 239 being connected to the output of gate 236.

When the latching operation of gates 239 and 240 takes place, output of gate 240 goes low and a signal is applied through a line 242 to all of the valve control units 101–116 (FIG. 2) for the insert units and also to the insert conveyor index control 52, locking out operation thereof. Gate 240 has an input connected through a manually operative switch 243 to ground and also to a terminal 244 connected to a switch in the program unit 28 which is normally open but which is closed at a certain point in the cycle to return gate 240 and hence gate 239 to the initial conditions.

The output of gate 240 is also applied through the line 221 to the gate 210 of the timing circuit 72 (FIG. 7) and additionally to one input of a gate 245 having an output connected to one input of a gate 246, the other input of gate 246 being connected to the reset line 218, also connected to the gate 217 of the timing circuit 72.

The output of gate 246 is applied through a gate 247, operative as an invertor, to a reset input of the counter 232. Line 166, which is connected to a switch in the program unit 28, is connected through a gate 248, operative as an inverter, to a second input of gate 245. At a certain point in the cycle, line 166 goes low and if at the same time, the output of gate 240 is high, which will be the case with an envelope present, the output of gate 245 goes low and through the gates 246 and 247, a reset signal is applied to the counter 232. However, if an envelope is missing, the output of gate 240 will be low and no reset signal is applied to the counter 232. Thus counter 232 accumulates counts only in response to missing envelopes during successive cycles of operation. The counter 232 is connected through a selector switch 250 to an output circuit 251 which is connected to a signal lamp 252 and also through a line 253 to the stop circuit 47.

FIG. 10 is a schematic diagram of the clock circuit 100, used for applying a clock signal to the shift register stages 77-99. A pair of gates 255 and 256 are provided having cross-connected inputs and outputs and having additional inputs connected to switches 257 and 258 which are in the program unit 28 and which are operated together. Normally, the output of gate 257 is low while that of gate 258 is high. At a certain point in the cycle, the switch 257 is closed, causing the output of gate 255 to go high and switch 258 is opened and the output of gate 256 goes from low to high, applying a clock signal through a line 259 to the shift register stages 77-99 and causing any signals stored in any stage to be shifted to the next stage.

The gate 256 has a third input connected to the line 242 from the envelope sense circuit. Line 242 goes low when there is no envelope at the station 17, to cause the output of the gate 256 to go high and to prevent application of the shift signal through line 259.

FIG. 11 is a schematic diagram of the stacker jam circuit 48. A pair of gates 261 and 262 are provided having cross-connected inputs and outputs. An additional input of gate 261 is connected through a line 263 to the stacker unit 19 while an additional input of gate 262 is connected to a reset line 264. Normally, the output of gate 261 is low and the output of gate 262 is high. When there is a jam at the stacker 19, the line 263 goes low causing the output of gate 261 to go high while the output of gate 262 goes low until reset by a low signal on line 264. When the output of gate 261 goes high, an output circuit 265 energizes a lamp 266 and applies a signal through line 267 to the stop circuit 47 to stop the machine.

The stuffer jam circuit 49 is substantially the same as the stacker jam circuit 48.

FIG. 12 shows the circuitry of the envelope feed and index control unit 45. A line 270, connected to the shift register stage 97, which corresponds to the stuffing mechanism 13, is connected through a gate 271, operative as an inverter, to one input of a gate 272 having a second input connected to the line 242 which is connected to an output from the envelope sense circuit 46, shown in FIG. 9. The output of the gate 272 is applied to an envelope feed control unit 273, having an output connected through a line 274 to the solenoid operated valve 35 and is also connected to an input of an envelope index control circuit 275 having an output connected through a line 276 to the solenoid operated valve 34. Additional inputs of the circuits 273 and 275 are connected through lines 277 and 278 which are connected to limit switches in the program unit 28, operated at certain times in the cycle of operation.

If there is a miss signal from the shift register stage 97, corresponding to the stuffing station, a low signal is applied to the input of the gate 271 causing the output thereof to go high and causing the output of gate 272 to go low, line 242 being normally high. With the output of the gate 272 low, neither the envelope feed control circuit 273 nor the envelope index control circuit 275 will be operative and no envelope will be fed or conveyed. If there is a miss signal from the shift register stage 97, applied through line 270, and there is also a low signal on the line 242, in response to the absence of an envelope at the sensing station 17, the output of the gate 272 will be high, permitting operation of the circuits 273 and 275 in response to signals applied from the program unit 28 through the lines 277 and 278. There is thus an override of a miss signal applied from the shift register stage 97, corresponding to the stuffing station, to permit operation of the circuits 273 and 275 even when an envelope is missing at the sensing station 17

FIG. 13 is a schematic diagram of the stop circuit 47. The block 280 indicates an arrangement of OR gate circuits which may be connected in conventional fashion to provide twenty-one inputs, as illustrated, and a single output, the arrangement being such that when any of the inputs is low, the output goes high. The first three inputs are from the lines 253, 158 and 188, from the envelope sense circuit 46, the address head sense circuit 54 and the No. 1 insert sense circuit 55. The next fifteen inputs are from the No.'s 2-15 insert sense circuits 56-70. The next input is from line 267, from the stacker jam circuit 48 and the final two inputs are from the stuffer jam circuit 49 and the address unit jam circuit 50. When the outputs from any such circuits go low, the output of the circuitry 280 goes high.

A pair of gates 281 and 282 are provided having cross-connected inputs and outputs, an additional input of gate 281 being connected through a gate 283, operative as an inverter, to the output of the circuitry 280, and an additional input of the gate 282 being connected to a reset circuit 284. The output of the gate 282 is applied through a gate 285, operative as an inverter, to an output circuit 286 which is connected to the start-stop control 24.

In operation, the output of the gate 281 is normally low while the output of gate 282 is normally high. When the output of the circuitry 280 goes high, in response to a low signal applied to any input thereof, the output of gate 283 goes low to cause the output of gate 281 to go high and to cause the output of gate 282 to go low, a high signal being normally applied from the reset circuit 284. When the output of gate 282 goes low, the output of gate 285 goes high to cause the output circuit 286 to apply a signal to the start-stop control 24 to stop operation of the machine. The operator may then ascertain the cause of the difficulty and after correcting it, may operate the reset circuit 284 to apply a low signal to the input of the gate circuit 282.

FIG. 14 illustrates a circuit 290 which may optionally be provided for automatically stopping the machine in response to a certain number of malfunctions in a certain time interval, even when none of the individual malfunctions or any accumulation thereof in the circuitry as heretofore described result in stopping of the machine. In this circuit, a gate 291 is provided having one input connected to the line 253 from the envelope sense circuit 46 and a second input connected through a line 292 to the final shift register stage 99. The output of the gate 291 is connected through a gate 293, operative as an inverter to a counter 294 connected through a selector switch 295 to an output circuit 296 which is connected to a signal lamp 297 and which has an output line 298 which may be connected to an additional input of the OR gate circuitry 280. An adjustable timer 300 is connected to a reset input of the counter 294. In operation, if there is a missing envelope during any cycle or the signal at the final shift register stage corresponding to a missing insert or addressed piece in a previous cycle, a count is entered into the counter 294. When a certain number of counts are accumulated, as determined by the selector switch 295, a signal is applied to the output circuit 296 which applies a signal through the line 298 to the stop circuit 47 to stop the machine. The counter 294 is, however, reset periodically by a signal applied from the adjustable timer 300. Thus, a certain number of malfunctions must be registered within the prescribed time interval before stoppage of the machine will occur. By way of example, the adjustable timer may be set to apply a reset signal every fifteen seconds and the selector switch 295 may be set to require an accumulation of six counts. Thus, if during any fifteen second time interval, more than five malfunctions occur, the machine will be automatically stopped. It is noted that the circuit illustrated does not respond to double signals when the mode of operation is such that the double signals are not effectively entered into the shift register. As an alternative, the line 292 might be connected to OR gate circuitry having inputs connected to the outputs of gates 150 and 180 of the address head and insert gate circuits of FIGS. 5 and 6 and also to gates corresponding to the gate 180, of the other insert circuits, so that a number of failures, either in the form of misses or doubles, within a predetermined time interval, will result in stopping of the machine.

It will be understood that modifications and variations may be effected without departing from the spirit and scope of the novel concepts of this invention.

We claim as our invention:

1. In a control system for a machine operable in repetitive cycles of operation and including product conveyor means arranged for indexing movement through a certain distance during each cycle and a series of operation means along said conveyor means each arranged to perform during each cycle a certain operation with respect to a product conveyed by said conveyor means, the effective spacing between adjacent operation means being an integer multiple of certain distance, shift register means having a series of cascaded stages including stages respectively corresponding to said operation means, signal means for supplying a malfunction signal in response to improper operation of each of said operation means, sensing means for each of said operation means and responsive to a malfunction signal therefrom to enter a signal into the corresponding stage of said shift register means, clock means operable during each cycle to shift any signal entered into any stage of said shift register means into a succeeding stage, and operation control circuit means for each of said operation means arranged to prevent operation thereof in response to shifting of a signal into the corresponding stage of said shift register means.

2. In a control system as defined in claim 1, wherein the machine further includes transfer means following said series of operation means for transferring a product from said conveyor means, said shift register means having a stage corresponding to said transfer means, and transfer control circuit means for preventing operation of said transfer means in response to a signal shifted into said corresponding stage of said shift register means.

3. In a control system as defined in claim 2, wherein the machine further includes eject means associated with said conveyor means following said transfer means, said shift register means having a stage corresponding to said eject means, and eject control circuit means for operating said eject means in response to a signal shifted into the corresponding stage of said shift register means.

4. In a control system as defined in claim 2, wherein the machine further includes second conveyor means arranged for indexing movement during each cycle and for receiving a product transferred by said transfer means from the first conveyor means, second conveyor control circuit means arranged for preventing operation of said second conveyor means in response to shifting of a signal into said stage of said shift register means which corresponds to said transfer means.

5. In a control system as defined in claim 4, wherein the machine further includes feed means arranged for feeding a product to said conveyor means for combination with a product fed from said first conveyor means by said transfer means, feed control circuit means arranged for preventing operation of said feed means in response to shifting of a signal into said stage of said shift register means which corresponds to said transfer means.

6. In a control system as defined in claim 5, means for supplying a feed malfunction signal in response to failure of operation of said feed means, and means responsive to said feed malfunction signal for preventing operation of said operation means, said first conveyor means, said transfer means and said clock means.

7. In a control system as defined in claim 1, each of said sensing circuit means including counter means arranged for accumulating counts in response to malfunction signals applied thereto, and output circuit means for developing an output signal when a certain number of counts are accumulated by said counter means, and stop means for stopping the machine in response to an output signal from the output circuit of any of said sensing circuit means.

8. In a control system as defined in claim 7, selector switch means in each sensing circuit means between said counter means and said output circuit thereof for determining the number of accumulated counts required for development of said output signal.

9. In a control system as defined in claim 7, reset means operative during each cycle for resetting said counter means when no malfunction signal is applied during that cycle.

10. In a control system as defined in claim 1, wherein said series of operation means include insert units for transferring to said conveyor means during each cycle a single insert from a stack of inserts, said malfunction signals including miss signals supplied in response to failure of transfer of inserts by said insert units.

11. In a control system as defined in claim 10, said malfunction signals further including double signals supplied in response to transfer of a plurality of inserts by any of said insert units, each of said sensing circuit means being operable in response to both miss and double signals to enter a signal into the corresponding stage of said shift register means.

12. In a control system as defined in claim 11, each of said sensing circuit means including selectively operable and inoperable inhibiting means for preventing entry of a signal in said shift register means in response to a double signal.

13. In a control system as defined in claim 1, wherein said series of operation means includes insert units for transferring to said conveyor means during each cycle a single insert from a stack of inserts, said malfunction signals including miss signals supplied in response to failure of transfer of an insert by any insert unit and double signals supplied in response to transfer of a plurality of inserts by any insert unit, each of said sensing circuit means being operable to enter a signal into the corresponding stage of said shift register means only in response to a miss signal, and each of said sensing circuit means including counter means arranged for accumulating counts in response to both miss and double signals applied thereto, and an output circuit for developing an output signal when a certain number of counts are accumulated by said counter means, and stop means for stopping the machine in response to an output signal from the output circuit of any of said sensing circuit means.

14. In a control system as defined in claim 13, reset means operative during each cycle for resetting said counter means when no malfunction signal is applied thereto during that cycle.

15. In a control system as defined in claim 1, means for supplying a second clock signal during a portion of each cycle of operation when said operation means are operative, each of said sensing circuit means including a latching circuit arranged to respond to said second clock signal and to a malfunction signal from the corresponding operation means to develop an output signal continuing until the termination of said second clock signal.

16. In a control system as defined in claim 15, each of said sensing circuit means including counter means arranged for responding to said output signal from said latching circuit for accumulating counts in response to malfunction signals, and an output circuit for developing an output signal when a certain number of counts are accumulated by said counter means.

17. In a control system as defined in claim 16, means for supplying a reset signal starting after the start of said second clock signal and ending before the end of said second clock signal, each of said sensing circuit means including a reset gate responsive to said output signal from said latching circuit and to said reset signal for resetting said counter when no output signal is developed by said latching circuit during said reset signal.

18. In a control system as defined in claim 16, wherein said series of operation means includes insert units for transferring to said conveyor means during each cycle a single insert from a stack of inserts, said malfunction signals including both miss signals supplied in response to the failure of transfer of an insert by any insert unit and double signals supplied in response to the transfer of a plurality of inserts by any insert unit, means for supplying an auxiliary control signal during a certain portion of each cycle, each of said sensing circuit means including a second latching circuit responsive to said auxiliary control signal and to the double signal from the corresponding operation means to develop an output signal, means for supplying both miss and double signals to the first latching circuit, and a gate circuit responsive to the output signals from said first and second latching circuits for entering a signal into the corresponding stage of said shift register means only in response to a miss signal.

19. In a control system as defined in claim 1, each of said sensing circuit means controlled from said operation control circuit means to prevent entry of a signal into the corresponding stage of said shift register means when operation of the corresponding operation means is prevented by the corresponding operation control circuit means.

20. In a control system as defined in claim 10, wherein said series of operation means further includes an address unit for transferring an addressed piece to said conveyor means ahead of said insert units, said malfunction signals further including miss signals supplied in response to failure of transfer of addressed pieces by said address unit.

21. In a control system as defined in claim 10, wherein the machine further includes a stuffing mechanism following said insert units for transferring a stack of inserts from said conveyor means, said shift register means having a stage corresponding to said stuffing mechanism, and stuffing control circuit means for preventing operation of said stuffing mechanism in response to a signal shifted into said corresponding stage of said shift register means.

22. In a control system as defined in claim 21, wherein the machine further includes eject means associated with said conveyor means following said stuffing mechanism, said shift register means having a stage corresponding to said eject means, and eject control circuit means for operating said eject means in response to a signal shifted into the corresponding stage of said shift register means.

23. In a control system as defined in claim 21, wherein the machine further includes an envelope conveyor means arranged for indexing movement during each cycle for receiving a stack of inserts transferred by said stuffing mechanism from the insert conveyor means, envelope conveyor control circuit means arranged for preventing operation of said envelope conveyor in response to shifting of a signal into said stage of said shift register means which corresponds to said stuffing mechanism.

24. In a control system as defined in claim 23, wherein the machine further includes envelope feed means arranged for feeding an envelope to said envelope conveyor, envelope feed control circuit means arranged for preventing operation of said envelope feed means in response to shifting of a signal into said stage of said shift register means which corresponds to said stuffing mechanism.

25. In a control system as defined in claim 24, envelope sense means for supplying a signal in response to failure of operation of said envelope feed means, and means responsive to said signal for preventing operation of said insert units, said insert conveyor means, said stuffing mechanism and said clock means.

26. In a control system as defined in claim 1, means for automatically stopping the machine when a certain number of malfunction signals are developed within a certain time interval.

27. In a control system for a machine operative in repetitive cycles of operation and including feed means operative in each cycle to feed a first product, first product conveyor means arranged to receive a first product from said feed means and for indexing movement in each cycle to move said first product to a sense station in one cycle and thence to an assembly station in a subsequent cycle, and means operative in each cycle for supplying a second product for transfer to said assembly station for combination with said first product, signal means for supplying a missing product signal in response to the absence of a product at said sense station, circuit means responsive to said missing product signal to develop a control signal for preventing operation of said supply means, wherein said circuit means include counter means arranged for accumulating counts in response to missing product signals applied thereto, an output circuit for developing an output signal when a certain number of counts are accumulated by said counter means, and stop means responsive to said output signal for stopping operation of the machine.

28. In a control system as defined in claim 27, selector switch means in said circuit means between said counter means and said output circuit for determining that a number of accumulated counts required for development of said output signal.

29. In a control system as defined in claim 27, reset means operative during each cycle for resetting said counter means when no missing product signal is applied during that cycle.

* * * * *